United States Patent
Scott et al.

(10) Patent No.: US 10,235,366 B2
(45) Date of Patent: Mar. 19, 2019

(54) ACTIVITY GALLERY VIEW IN COMMUNICATION PLATFORMS

(71) Applicant: Microsoft Technology Licensing, LLC, Redmond, WA (US)

(72) Inventors: Thaddeus Adam Scott, Kirkland, WA (US); James Edgar Pycock, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

(21) Appl. No.: 15/238,592

(22) Filed: Aug. 16, 2016

(65) Prior Publication Data

US 2018/0052840 A1    Feb. 22, 2018

(51) Int. Cl.
| | | |
|---|---|---|
| G06F 17/30 | (2006.01) | |
| G06F 3/0484 | (2013.01) | |
| H04L 29/08 | (2006.01) | |
| H04N 7/15 | (2006.01) | |
| H04L 12/18 | (2006.01) | |
| G06Q 10/10 | (2012.01) | |
| H04L 12/58 | (2006.01) | |

(52) U.S. Cl.
CPC ...... *G06F 17/30029* (2013.01); *G06F 3/0484* (2013.01); *G06F 17/30058* (2013.01); *G06F 17/30867* (2013.01); *H04L 12/1831* (2013.01); *H04L 67/22* (2013.01); *H04L 67/327* (2013.01); *H04N 7/15* (2013.01); *G06Q 10/107* (2013.01); *H04L 51/046* (2013.01)

(58) Field of Classification Search
CPC ............. G06F 17/30029; G06F 3/0484; G06F 17/30058; G06F 17/30867; H04L 12/1831; H04L 67/22; H04L 67/327; H04L 51/046; H04N 7/15; G06Q 10/107
See application file for complete search history.

(56) References Cited

U.S. PATENT DOCUMENTS

| | | |
|---|---|---|
| 7,558,221 B2 | 7/2009 | Nelson et al. |
| 8,196,051 B2 | 6/2012 | Zaner et al. |
| 8,718,386 B2 | 5/2014 | Das et al. |
| 8,732,161 B2 | 5/2014 | Jain et al. |

(Continued)

OTHER PUBLICATIONS

Braga, Matthew, "The Best Way to Organize Your Massive Photo Library", Published on: Jun. 10, 2010 Available at: http://www.tested.com/tech/photography/413-the-best-way-to-organize-your-massive-photo-library/.

(Continued)

*Primary Examiner* — Mandrita Brahmachari

(57) ABSTRACT

Systems, apparatuses, services, platforms, and methods are discussed herein that provide activity-based gallery views for communication platforms. In one example, a media gallery service is provided that determines contextual properties associated with media objects shared over communication sessions provided by a communication platform. Based at least on the contextual properties, the gallery service establishes internal sequencing among the media objects for each of the communication sessions, and presents an activity view in the user interface comprising a representation relating the communication sessions, with each of the communication sessions having associated media objects organized at least according to associated internal sequencing.

20 Claims, 5 Drawing Sheets

(56) References Cited

U.S. PATENT DOCUMENTS

| | | | |
|---|---|---|---|
| 9,137,308 B1 | 9/2015 | Petrou et al. | |
| 2009/0288007 A1 | 11/2009 | Leacock et al. | |
| 2010/0153453 A1* | 6/2010 | Knowles | G06F 17/30867 |
| | | | 707/784 |
| 2012/0079099 A1 | 3/2012 | Dhara et al. | |
| 2012/0084672 A1* | 4/2012 | Vonog | G06F 3/0486 |
| | | | 715/756 |
| 2012/0287231 A1 | 11/2012 | Ravi et al. | |
| 2013/0330019 A1 | 12/2013 | Kim et al. | |
| 2014/0133766 A1* | 5/2014 | Das | H04N 5/2251 |
| | | | 382/224 |
| 2014/0282901 A1* | 9/2014 | Dwan | H04L 63/0892 |
| | | | 726/4 |
| 2014/0310353 A1 | 10/2014 | Schneider et al. | |
| 2015/0205770 A1 | 7/2015 | Shershevsky et al. | |
| 2015/0211858 A1 | 7/2015 | Jerauld | |
| 2015/0261389 A1 | 9/2015 | Abate | |
| 2016/0014059 A1 | 1/2016 | Rathod | |
| 2016/0072861 A1 | 3/2016 | Woolsey et al. | |
| 2016/0150009 A1 | 5/2016 | LeRoy et al. | |

OTHER PUBLICATIONS

"International Search Report and Written Opinion Issued in PCT Application No. PCT/US2017/045404", dated Oct. 26, 2017, 15 Pages.

Raento, et al., "Context Phone: A Prototyping Platform for Context-Aware Mobile Applications", In Journal of IEEE Pervasive Computing, vol. 4, Issue 2, Apr. 2005, pp. 51-59.

* cited by examiner

ACTIVITY GALLERY VIEW IN COMMUNICATION PLATFORMS

BACKGROUND

Video conferencing and telephony services have become more popular as the capacity and capabilities of networks and communication devices have advanced. Users of these services engage in video calls in the context of business, social, and other interactions, and using a variety of communication platforms and technologies. Skype®, Skype® for Business, Google Hangouts®, and Facetime® are just some examples of such services.

Many video calls employ bi-directional streams to carry video of the participants on a call. In one direction, for example, a video of the caller is carried upstream from the caller to the called party. In the other direction, video of the called party flows downstream to the caller. The video streams may flow through a mediation server or they may be exchanged directly between the participant nodes. A record may be persisted in the call history of each participant. The call history may indicate, for example, a time the call occurred, users that were involved, and the call duration.

Overview

Systems, apparatuses, services, platforms, and methods are discussed herein that provide activity-based gallery views for communication platforms. In one example, a media gallery service is provided that determines contextual properties associated with media objects shared over communication sessions provided by a communication platform. Based at least on the contextual properties, the gallery service establishes internal sequencing among the media objects for each of the communication sessions, and presents an activity view in the user interface comprising a representation relating the communication sessions, with each of the communication sessions having associated media objects organized at least according to associated internal sequencing.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Video conferencing and telephony services provided by communication platforms over which users of these services engage in communication sessions among two or more parties. Typically, users can access the communication platforms using an application, mobile app, gaming application, or other user application. Communication sessions can include video calls and video conferencing, during which sharing among users can occur for various media objects, such as pictures, movies, videos, text, documents, presentations, audio content, music, or other media objects.

In the examples herein, communication session records may be persisted for each participant. The call history may indicate, for example, a time the call occurred, users that were involved, and the call duration. Also, call history can include media objects shared between parties, or moments captured during communication sessions. Messaging and conferencing applications can provide a screen or view in the application which displays the photos shared in a particular conversation (often called a 'gallery'). Such a view typically shows, for example, a grid arrangement of all the photos that have been shared via photo-messages within a conversation. The view can be considered a filter on the conversation which does not show the text messages and only shows the media content. In some examples, the view is organized by date, though often the view is merely a sequential ordering of photos.

The examples herein include enhanced gallery views. Media objects, such as pictures, can be organized according to one or more contextual properties that relate the media objects to moments within the individual communication sessions. This contextual information can be stored along with the associated media objects, and used to present various views to a user in a graphical user interface. As will be discussed below, these views can be arranged by the contextual properties, modality of sharing, and multi-dimensional galleries, among other representations.

The gallery views discussed herein can provide users with the ability to reminisce over past conversations and communication sessions by re-living the context during which photos, videos, messaging, or other media content occurs within a communication session and in time-wise relation to other media objects. Moreover, filtering and searching can be provided using the contextual properties to provide enhanced searching among media objects associated with communications sessions. A gallery can accumulate media objects over many communication sessions and present these media objects in a contextually related manner to users. Thus, users can be provided with a continuous and evolving graphical representation of the communications between members of the various conversations.

Figure 1:
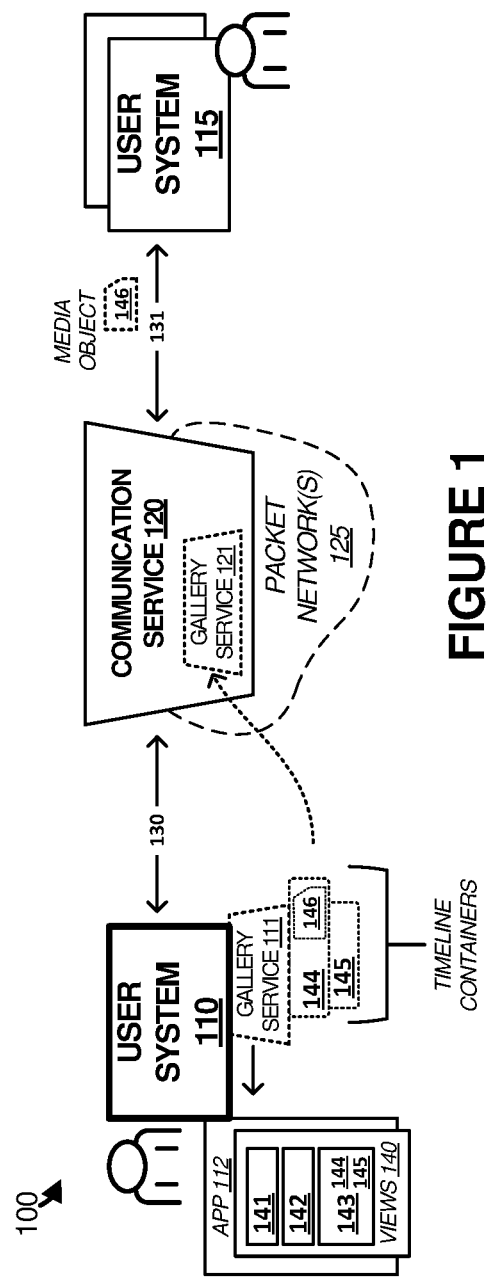
FIG. 1 is a diagram of a gallery environment in an implementation.

To further illustrate enhanced gallery services and associated communication platforms, FIG. 1 is provided. FIG. 1 is a diagram of gallery environment 100 in an implementation. Environment 100 includes user system 110 and user system 115 which can communicate using communication service 120. Communication service 120 transports traffic between user systems 110 and 115 over packet networks 125 and communication links 130-131. In operation, any of user system 110 or 115 can initiate communication sessions with another user system, such as a video call, video conference, audio call, or other interactive communication session.

Communication service 120 facilitates the communication sessions between user devices, and can comprise one or more server systems that can include virtualized or distributed computing systems.

A gallery service is provided in FIG. 1 to provide enhanced operation of a communication platform employed by users, such as user system 110 or user system 115. This gallery service can be provided by user system 110 as gallery service 111, or can be provided by communication service 120 as gallery service 121. Combinations of functionality can be shared or distributed among gallery service 111 and gallery service 121, along with storage and processing features of the gallery service.

The gallery service can provide one or more views 140 for a user interface to communication service 120. In FIG. 1, views 141, 142, and 143 can each comprise search views, filtered views, timeline views, activity views, and other view types. For example, view 143 comprises an activity view that includes past activity logged between users that communicate over communication service 120. This past activity can also include contextually-arranged media objects for each communication instance. These contextually-arranged media objects can comprise a timeline representation of a conversation among users, and are exemplified by timeline containers 144-145 in FIG. 1.

For example, during a video call, two users can share media object 146, such as a photo, on a shared canvas presented in one of views 140. This photo can have contextual properties stored which relate to a time of the sharing, a type of communication session in progress during the sharing, identities of the users involved, and captured audio or video from the video call proximate to the photo sharing event. At a later time, one or more of the users can view this video call in a gallery view which can not only preserve details of the video call, such as a time of the call, but also capture moments during the video calls, such as the moment of the photo sharing. This moment can be memorialized in contextual properties and other related data that indicate a time during the video call that the photo was shared, the conversation medium (i.e. video call), and any captured video/audio proximate to the sharing. Further details of these elements are discussed in the examples below.

Figure 2:
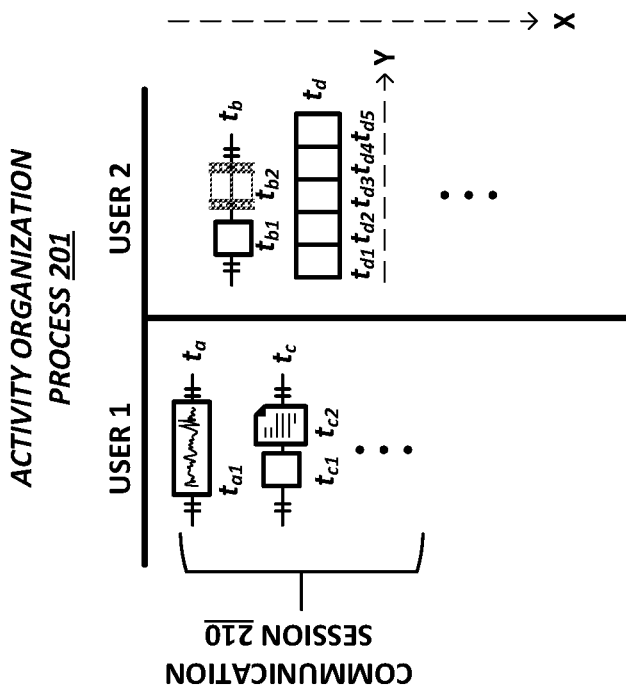
FIG. 2 illustrates example contextual organization in an implementation.

FIG. 2 is presented to illustrate example activity arrangement process 201 of media objects from a communication session between two users. In FIG. 2, arrangements of media objects shared during communication session 210 between user 1 and user 2 are shown. In the vertical direction, indicated by an 'x' axis in FIG. 2, a timeline of interaction between user 1 and user 2 can be organized. This timeline can be for a single communication session, such as indicated for session 210, or can be for more than one communication session.

Each instance of a media object sharing event is indicated by a respective time, namely times $t_a$, $t_b$, $t_c$, and $t_d$. In addition to the vertical timewise arrangement of media sharing events, each event can have further internal sequencing or ordering based on when media objects are shared during the event, as shown in the horizontal direction 'y' in FIG. 2. For example, event $t_a$ shows an audio clip shared, event $t_b$ shows a photo and a movie shared, event $t_c$ shows a photo and a document shared, and event $t_d$ shows a series of photos or a presentation. The relative timing of sharing for these media objects can be identified and presented to a user in an arrangement that reflects the relative timing or other contextual properties. Other objects shared can include videos, photos, audio, documents, messages, data files, and the like.

To determine the internal sequencing among media object sharing for events and within individual events, a gallery service, such as gallery service 111 or 121 in FIG. 1, can employ contextual properties or contextual information determined during the moments that these media objects are shared. Contextual properties can include relationships between media object types, indicators of communication session types, modalities of sharing, user/party identities, and relative timings during the communication sessions when the associated media objects are shared. The contextual properties can also include descriptors of user activity occurring in the communication sessions proximate to times of sharing of associated ones of the media objects. Contextual information or contextual properties can be stored along with the media objects, such as using metadata associated with the media objects. Contextual information or contextual properties can be stored in log files, databases, or other data structures that preserve the contextual properties as correlated to associated media objects. Thus, during a communication session, a user can have an enhanced log and media gallery of media objects and occurrences associated with the communication session. The enhanced media gallery can be arranged in various views, which can allow for searching, pivoting, and sorting using the contextual properties of the media objects.

In addition, moments can be captured by recording or capturing portions of the communication session itself during times proximate or overlapping with media object sharing events. This moment capturing can be automatic or manual. In automatic examples, a snippet of the associated communication session can be prompted to be recorded and stored responsive to a user sharing a media object. Other triggers for automatic moment capturing can be established using analysis of the communication session stream, such as when short term volume increases are identified denoting an excited or important moment. In manual examples, a user might select a record button or other user interface element that can capture a predetermined portion of the communication session surrounding the selection, including portions of the communication session that occur just prior to the user selection.

Figure 3:
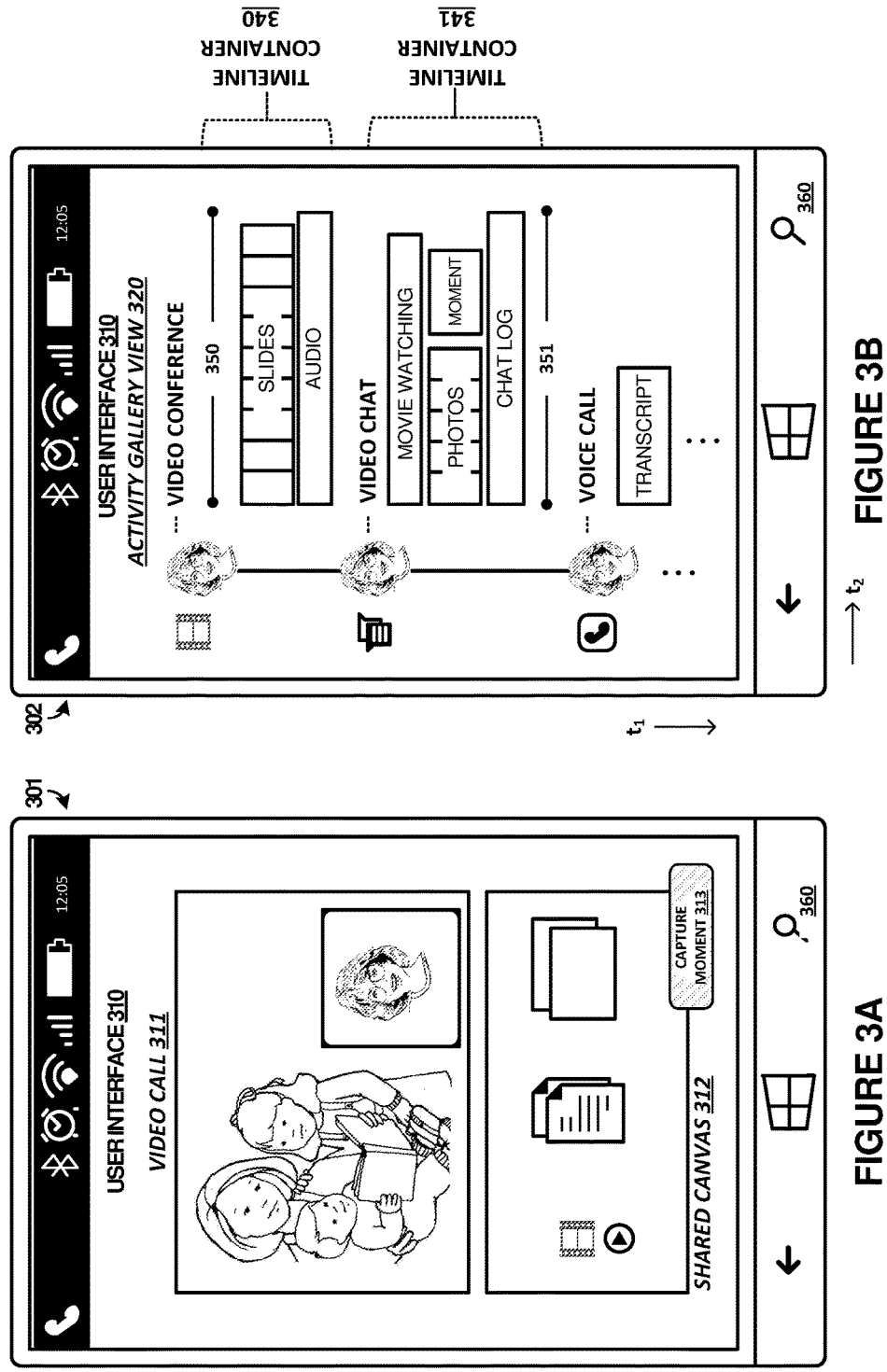
FIG. 3A illustrates example shared canvas views in an implementation.
FIG. 3B illustrates example activity gallery views in an implementation.

Further examples of the various views can be seen in FIG. 3. FIG. 3 illustrates two example views of a user interface presented to a user of a communication application. In configurations 301 and 302, user interface 310 is provided as a user interface to a communication service, such provided by communication service 120 in FIG. 1. For example, a user application can be executed by an associated user device and this user application can provide user interface 310. Users can communicate with each other using this user application, by way of commands and interfacing with user interface 310 on a respective user device. Also, the user application can provide a gallery service to allow users to view media objects shared over various communication sessions. This gallery service can intelligently arrange media objects according to contextual information derived from the communication sessions.

In configuration 301, user interface 310 is provided on a smartphone or tablet device which provides for a portion with video call 311 occurring between two or more parties. This video call can include video, audio, and messaging elements that are employed in communication sessions between the parties. In addition to the portion of user interface 310 in which video call 311 is presented, shared canvas 312 portion is also provided in user interface 310. Shared canvas 312 can be employed by users to share media objects during a communication session, such as during a video call. These media objects can be shared using shared canvas 312 for viewing by all parties to the communication session.

In addition to sharing objects via shared canvas 312, moments can be captured during communication sessions. Communication applications, like Skype® or Skype® for Business, can be platforms where unique things happen between users. User interface 310 can allow users to capture clips, as well as snap images and moments from a video call or other communication session. These moments can be stored for later viewing in a gallery view. In configuration 301, a user interface element, such as capture moment button 313, can be included to allow a user to capture a moment or to indicate when a moment is being captured. The shared canvas as well as the gallery view (discussed below) can be co-browsed by users during further communication sessions and moments from past communication sessions can be re-lived by the parties involved. Content that can be captured in moments include photos, shared videos or movies, games played together, or apps and web sites interacted with together during communication sessions. Thus, a gallery view will include more than just photos shared during communication sessions, as the gallery view can include moments captured during communication sessions.

In configuration 302, user interface 310 is provided with activity gallery view 320. Gallery view 320 includes a timewise representation of not only several communication sessions, but also each communication session has internal sequencing for events that occur within the respective communication session. In configuration 302, three communication sessions are shown, namely a video conference, a video chat, and a voice call. These different types of communication sessions can all be provided by the user application and communication service discussed above. Also, for each communication session, one or more timeline containers 340-341 are established that provide internal sequencing for the particular communication session.

These timeline containers can provide a user with various representations of events during a communication session. The containers can distinguish among content captured from a communication session, content shared during a communication session, and content messaged during a communication session. Captured content can include moments, snaps, clips, and the like. Shared content can include media objects. Content messaged can include text-based communications, such as instant messaging content, emoji content, and the like.

The presentation of gallery view 320 can be based on human notions of activities and events which is different than a grid-based arrangement of photos found in some chat applications. The communication service supports sharing and capturing of media objects during calls (synchronously) and sharing between calls (asynchronously). Gallery view 320 can be segmented according to the activity/moment (i.e. shared while users were on a call together vs shared by separate photo-messages; or captured during a call together versus shared by separate photo-messages). Gallery view 320 can be organized according to users that were involved in the communication sessions, or other pivots, such as content type, mode of sharing (i.e. via voice call or during video conference). Gallery view 320 can not only display media shared during synchronous activities (e.g. calls) and asynchronous (e.g. messaging between calls) but also differentiate between these activities. For example, activity differences arise between sending you a URL to link to a movie, compared to users watching the movie together for a couple of hours. The URL may be the same shared media item but it was involved in very different experiences and activities and gallery view 320 can indicate these differences to users.

Gallery view 320 can provide a history not only of content that was shared but what events were done together by users, such as a shared game experience, watching a film/movie together, telling/creating a story together, along with the actual content associated with those events, such as the game application/link, movie data file or URL, or story document. In one example scenario, participants on a video call—such as grandparents and grandchildren—can make a story together during the video call by mixing photos, clip art, special effects, animations, audio, and the like. Once the story that is made, and the moments captured during the story-making activity, this story and associated moments can be stored by the video call application, and presented in gallery view 320.

Grouping collections of content by activity can also allow re-sharing the whole (activity based) collection. For example, photos shared in a video call with a user could be the same collection that another user desires to share with others in a family. These collections of media objects, such as photos, can be shared to other users within the user application. The sharing can occur using a collection of content that is associated with a particular communication session or portion of a communication session. Contextual information can be considered when grouping content from communication session, such as to group photos shared during watching of a movie over a video call. This grouped content can be shared among users that participated in the communication session, or to other users not involved in the original communication session.

Content can be resurfaced to users at a later time than shared, such as at predetermined times (anniversaries, important dates related to the content). Moreover, content can be resurfaced to users from prior video calls once new video calls are initiated to remind the participants of past activities and events during past video calls. This surfacing can be triggered by initiation of another video call to the same user or users. Resurfaced content can be augmented with data about the activity or communication session during which the content was shared or captured. Information related to the activity or communication session can be employed to drive resurfacing. For example, when a user starts a new activity which is the same type of activity as previously occurred, and saved content had been preserved from that previous activity then the gallery platform can resurface the saved content during the new instance of the activity.

In addition, augmenting data can be included in the contextual properties and stored with the media objects, such as web searches performed during the sharing experience that relates to current events or relevant information found from external sources. Other augmenting data can include dates and meetings of note from calendars associated with users, noting places and terms of user interactions and relationships.

Separate gallery views or pages within a gallery can be presented with various augmented data as well as different 'pivots' on the various contextual properties and augmented data. Gallery view 320 can also include various filters for arranging or surfacing media objects or content of a selected type. For example, gallery view 320 can have a photo-only filter, video-only filter, or person-based filters, among others.

Figure 4:
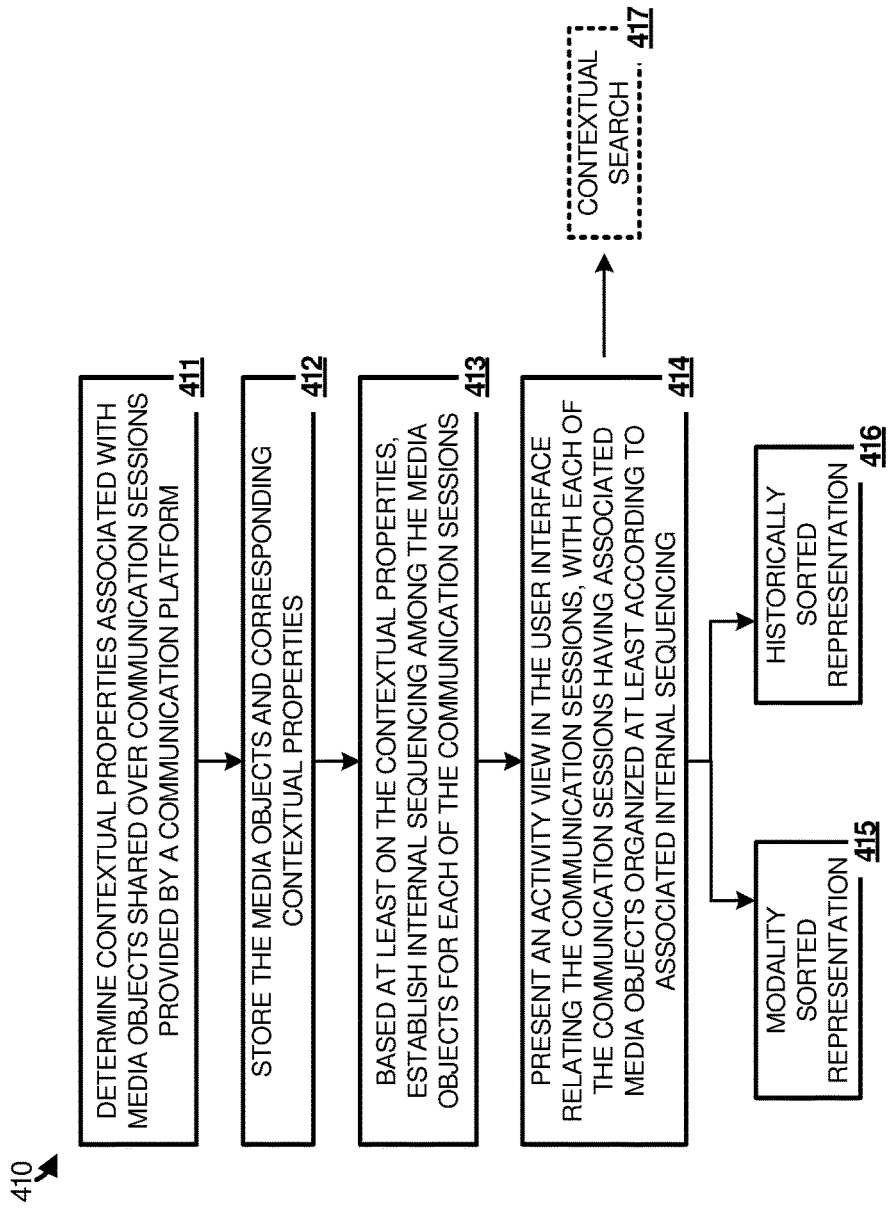
FIG. 4 illustrates an example method of operating a gallery service.

To further illustrate operation of a gallery view and other views within a user interface to a communication service, FIG. 4 is presented. FIG. 4 is flow diagram 410 illustrating example operations of a communication platform, such as that provided in FIG. 1 or FIG. 5. For this example, the operations of FIG. 4 are discussed in the context of user system 110. In FIG. 4, user system 110 engages in communication sessions provided by communication service 120. These communication sessions can be with other users, such as user system 115, among others. The communication sessions can include video calls, voice calls, video conferences, or other interactive communication modes. For example, user 110 might desire to engage in a video call with user 115, and employs user application 112 executed by user system 110 to initiate a video call with user system 115 over communication service 120.

During these communication sessions, various media objects, such as media object 146, might be shared among the users, such as photos, videos, audio clips, animations, emoji, messages, news articles, links to data, documents, data files, code snippets, URLs, or other media objects. In addition, various events of interest can occur, such as interactive storytelling, important portions of shared presentations, or other events of interest that can be captured by a user as a special moment. User system 110 can employ gallery service 111 which not only can store and track the media objects and captured moments, but also contextual information related to the media objects and captured moments. Portions of gallery service 111 can be included in gallery service 121 of communication service 120.

Gallery service 111 determines (411) contextual properties associated with media objects shared over communication sessions provided by a communication platform. The media objects can be shared over a shared canvas, as discussed herein, shared using various user interface elements of application 112 to access previously stored media objects, or to capture new media objects or moments (such as new photos or videos captured during the communication session). The communication platform can include user application 112 and communication service 120. The media objects and captured moments can be stored (412) in storage devices of user system 110, or stored in remote storage devices or distributed storage systems with symbolic linking performed by user application 112 to access the stored objects and moments.

The contextual properties indicate various contextual information related to the media objects during the communication sessions. Contextual properties can include relationships between media object types, indicators of communication session types, modalities of sharing, user/party identities, and relative timings during the communication sessions when the associated media objects are shared. The contextual properties can also include descriptors of user activity occurring in the communication sessions proximate to times of sharing of associated ones of the media objects. Contextual information or contextual properties can be stored along with the media objects, such as using metadata associated with the media objects. Contextual information or contextual properties can be stored (412) in log files, databases, or other data structures that preserve the contextual properties as correlated to associated media objects. Thus, during a communication session, a user can have an enhanced log and media gallery of media objects and occurrences associated with the communication session.

Based at least on the contextual properties, gallery service 111 establishes (413) internal sequencing among the media objects for each of the communication sessions. The internal sequencing can relate directly to a time within each communication session at which a media object is shared or a moment captured. The sequences can also include ordering determined by relative times between various media objects or moments. Other sequencing can be determined based on other contextual properties and prioritization. This internal sequencing can be captured in timeline containers that relate media objects to relative timing within the communication session. In FIG. 1, timeline containers 144 and 145 are shown, with example media object 146 included in container 144. In FIG. 3, three timeline containers are shown with various internal sequencing, namely timeline containers 340-341. FIG. 2 illustrates some example processes to determine internal sequencing and ordering among media objects and captured moments within a particular communication session. The timeline containers can be stored in one or more data structures for later use by a gallery view or search views, and can be stored using descriptive data which includes sequencing information, time information, communication session identifiers, and other contextual properties.

A user can enter into a gallery view to be presented with a log of past activity over one or more communication sessions. Gallery service 111 presents (414) an activity view in the user interface relating the communication sessions, with each of the communication sessions having associated media objects organized at least according to associated internal sequencing. In FIG. 1, these views are represented with elements 140-143, although configuration 302 in FIG. 3 provides a more detailed example. The activity view can be arranged in various alternate views, which can allow for searching, pivoting, and sorting using the contextual properties of the media objects. Media objects and captures moments can be distinguished based on sharing time, communication session duration, participants, associated action, and the types of media objects. For example, a photo-message is a type of message, and video-message is another type of message, both with a single message sent or receipt time. However, a voice call or video call has a start, end, and duration, and various events and actions can take place during that time. When a call ends, a call record can be stored in the conversation history and that call record can be expanded to include media shared during the call as well as the contextual properties and internal sequencing information.

Turing again to the example in FIG. 3, configuration 302 includes activity gallery view 320 in user interface 310. A vertical axis represents a first timescale, $t_1$, which indicates individual communication sessions that have occurred over time for a particular user. Views can include communication sessions associated with a single user or multiple users, deepening upon user selection in user interface 310. In view 320, three communication sessions are included, namely a video conference, a video chat, and a voice call. However, instead of merely having call properties such as a time of call or duration of a call, gallery view 320 includes further information. It should be noted that gallery view 320 can still include information indicating a time of a session or duration of a session, such as shown for elements 350-351.

For the first communication session in view 320, namely the video conference, an internal sequence is determined for media object shared during that communication session. Specifically, a sharing of presentation slides and audio content occurred during the video conference, and relative timings along with other contextual properties are stored and used to determine internal sequencing. This information, along with optionally the media objects themselves, can be included in timeline container 340 and stored for use in gallery 320. In other examples, timeline container 340 is generated ad hoc in response to user selections in user interface 310 to view a gallery representation of a particular communication session. In FIG. 3, the timeline containers are organized along a second axis that represents a timeline or timeframe within a particular communication session, indicated by time axis $t_2$.

A second communication, a video chat, is also shown in FIG. 3. This video chat might include two users watching a movie together over the communication service, such as when friends or family are located remotely from each other but still want to share the movie-watching experience. The movie might be placed into the shared canvas in configuration 301 (whether by direct sharing of the media file or sharing of a URL or other link), and watched by both users simultaneously. A chat log might be included as well that captures messaging or chat content between the users during the movie, such as comments and various scenes and characters in the movie. Moreover, photos might be shared among the users, such as recent news clippings or movie poster images. Special moments of interest might also be captured during the video chat, such as during a favorite scene or to capture a user reaction to a particular scene in the movie. The moment can be captured in response to user commands entered into user interface 310 (i.e. touching capture button 313) or automatically in response to intelligent monitoring of the user activity (i.e. a volume level or detected smile of a user).

Contextual meaning for the media objects as well as moments captured for the video chat can be preserved and presented in gallery view 320. In FIG. 3, gallery view 320 is presented as a historical view (416), but other views can be presented, such as search views, modality-based views, per-user views, and the like. Timeline container 341 can include internal sequencing which relates the various media objects and captured moments to each other and to the start/end of the communication session itself. Users can 're-live' the communication session at a later time by looking at a gallery view of timeline container 341 associated with the video chat. Also, more than simply presenting a grid view of photos shared, the photos (along with other elements) can be arranged according to when these objects were shared or captured during a communication session.

Advantageously, the timeline containers as well as the contextual information stored for each media object or captured moment can provide for enhanced searching and pivoting, allowing more efficient discovery of objects by users. For example, a contextual search (417) can be performed based on various information contained in the contextual properties, such as a search based on media type, relative timing among shared objects, a modality of sharing (i.e. what type of communication session was in progress during a particular object sharing), or others. A modality sorted representation (415) can be presented to a user. The modality can indicate a 'mode' of communication, such as a video chat, video call, text message, voice call, video conference, or other communication type. Gallery view 320 can provide a modality sorted or pivoted arrangement that lists each communication session type and the various media objects or captured moments associated therewith.

A user might want to search for photos shared during video chats in the last two weeks in order to find a picture of interest. For example, a search interface can be presented when a user selects interface element 360 which allows for text-based or voice-based entry of search terms. A new view/user interface arrangement can be presented for entry of search terms, or a popup graphical user interface element can be presented which allows entry of the search terms. These search terms can be employed to search among the contextual properties stored for past communication sessions as well as the media objects/captured moments. Boolean logic or other logic can be employed to allow a user to search for media objects within particular communication sessions, or using relative times within communication sessions or relative to sharing of other media objects or captured moments.

Thus, the examples presented herein have technical effects of more efficient use of processing and display resources by contextualizing media objects and captured moments within communication sessions to preserve internal sequencing, among other contextual properties. Further technical effects are enhanced user interfaces presented which allow for efficient viewing of past communication sessions and searching of media content in various ways based on the contextual information or properties determined for each communication session and associated media objects/moments.

Figure 5:
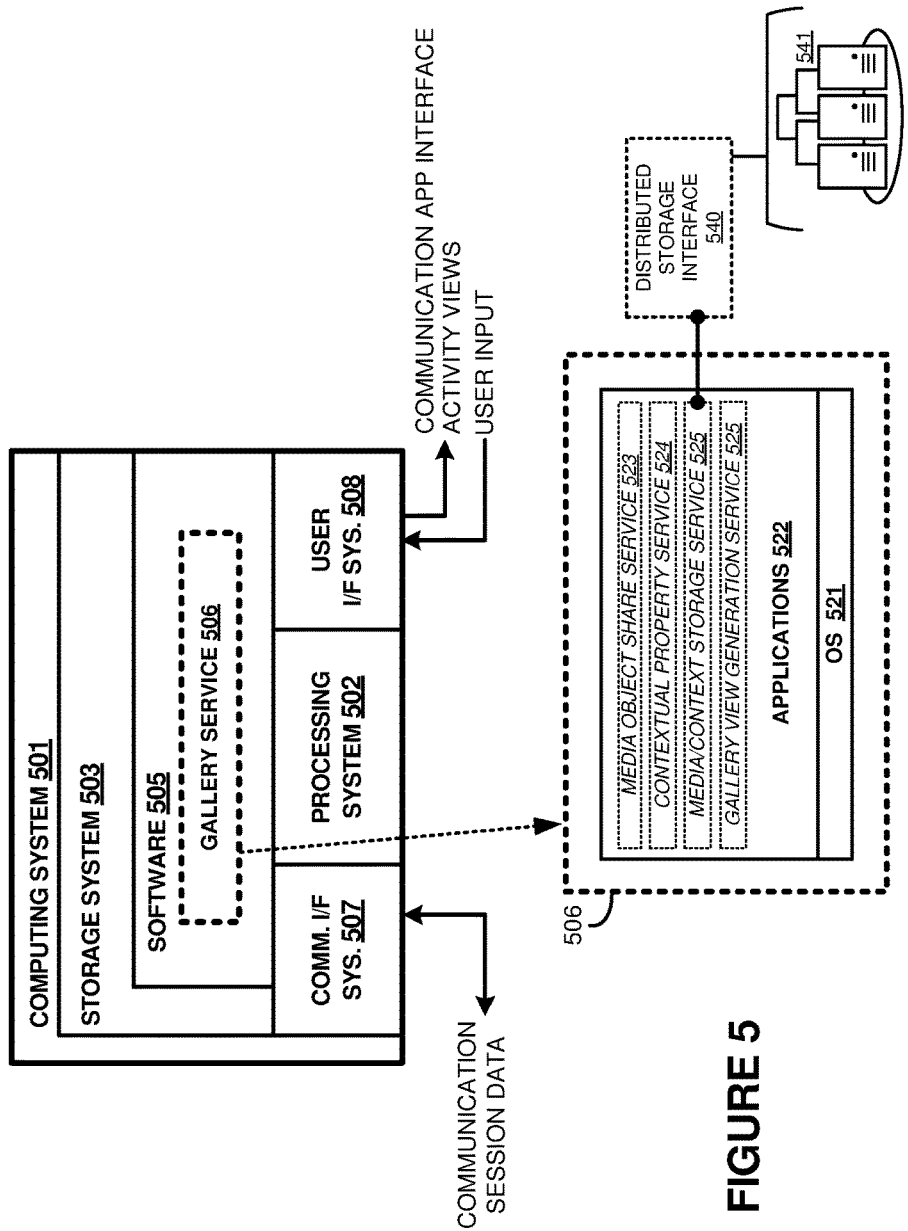
FIG. 5 illustrates an example computing platform for implementing any of the architectures, processes, methods, and operational scenarios disclosed herein.

FIG. 5 illustrates computing system 501 that is representative of any system or collection of systems in which the various operational architectures, scenarios, and processes disclosed herein may be implemented. For example, computing system 501 can be used to implement any of the elements of FIG. 1, such as user systems 110/115, gallery service 111/121, elements of communication service 120, application 112.

Examples of user systems 110/115 when implemented by computing system 501 include, but are not limited to, a smartphone, tablet computer, laptop, personal communication device, personal assistance device, wireless communication device, subscriber equipment, customer equipment, access terminal, telephone, mobile wireless telephone, personal digital assistant, personal computer, e-book, mobile Internet appliance, wireless network interface card, media player, game console, gaming system, or some other communication apparatus, including combinations thereof. Examples of communication service 120 when implemented by computing system 501 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 508. Processing system 502 is operatively coupled with storage system 503, communication interface system 507, and user interface system 508.

Processing system 502 loads and executes software 505 from storage system 503. Software 505 includes gallery service 506, which is representative of the processes, services, and platforms discussed with respect to the preceding Figures.

When executed by processing system 502 to provide enhanced activity views and gallery services, document recognition services, or scene description services, among other services, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced activity views and gallery services, among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include gallery service 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to provide enhanced activity views and gallery services, among other services. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Gallery service 506 includes one or more software elements, such as OS 521 and applications 522. Applications 522 can include media object share service 523, contextual property service 524, media/context storage service 525, gallery view generation service 525, or other services which can provide enhanced communications services and gallery views to a user. These services can employ one or more platforms or services deployed over a distributed computing/storage system, such as elements 541 in FIG. 5 that are interfaced via distributing computing interface 540. Applications 522 can receive user input through user interface system 508. This user input can include user commands, as well as imaging data, scene data, audio data, or other input, including combinations thereof.

Media object share service 523 provides users with the ability to share media objects on a shared canvas as well as capture moments from communication sessions, such as to record or capture images/video/audio from communication sessions. Contextual property service 524 determines contextual properties and internal sequencing among various media objects and captured moments for use in time-wise representations related to individual communication sessions. The contextual information can be stored along with the media objects, links to media objects, or captured moments by media/context storage service 525, which can include local storage or distributed/remote storage systems. Gallery view generation service 525 presents one or more views to users that organize communication session histories and logs, along with sequencing internal to the individual communication sessions. Various views provided by gallery view generation service 525 can include pivoting or searching based on user inputs, per-user views, or other views.

Communication interface system 507 may include communication connections and devices that allow for communication with other computing systems (not shown) over communication networks (not shown), or with distributed computing/storage elements 541. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. Physical or logical elements of communication interface system 507 can receive link/quality metrics, and provide link/quality alerts or dashboard outputs to users or other operators.

User interface system 508 may include a touchscreen, keyboard, mouse, voice input device, audio input device, or other touch input device for receiving input from a user. Output devices such as a display, speakers, web interfaces, terminal interfaces, and other types of output devices may also be included in user interface system 508. User interface system 508 can provide output and receive input over a network interface, such as communication interface system 507. In network examples, user interface system 508 might packetize display or graphics data for remote display by a display system or computing system coupled over one or more network interfaces. Physical or logical elements of user interface system 508 can provide alerts or visual outputs to users or other operators. User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

User interface system 508 can also include various hardware and software elements for capturing digital images, video data, audio data, or other sensor data which can be used to capture media objects for users of computing system 501. Video and audio systems can include digital imaging elements, digital camera equipment and circuitry, microphones, light metering equipment, illumination elements, or other equipment and circuitry. Analog to digital conversion equipment, filtering circuitry, image or audio processing elements, or other equipment can be included in user interface system 508.

Communication between computing system 501 and other computing systems (not shown), may occur over a communication network or networks and in accordance with various communication protocols, combinations of protocols, or variations thereof. For example, computing system 501 when implementing a user device, might communicate with distributed computing/storage elements 541 over distributed computing interface 540. Examples networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A computing apparatus comprising one or more computer readable storage media, and a processing system operatively coupled with the one or more computer readable storage media. The computing apparatus includes a gallery service comprising program instructions stored on the one or more computer readable storage media that, when read and executed by the processing system, direct the processing system to at least determine contextual properties associated with media objects shared over communication sessions provided by a communication platform. Based at least on the contextual properties, the gallery service establishes internal sequencing among the media objects for each of the communication sessions, and presents an activity view in the user interface comprising a representation relating the communication sessions, with each of the communication sessions having associated media objects organized at least according to associated internal sequencing.

Example 2

The computing apparatus of Example 1, where the program instructions further direct the processing system to present a contextual search interface element in the user interface, and responsive to a search initiated through the contextual search interface element, search among the media objects to return indicators of ones of the communication sessions that are correlated to one or more contextual search terms included in the search.

Example 3

The computing apparatus of Examples 1-2, where the contextual properties comprise relationships between at least media object types, communication session types, and relative timings during the communication sessions when the associated media objects are shared.

Example 4

The computing apparatus of Examples 1-3, where the contextual properties comprise descriptors of user activity occurring in the communication sessions proximate to times of sharing of associated ones of the media objects.

Example 5

The computing apparatus of Examples 1-5, where the program instructions further direct the processing system to present a modality sorted representation of the activity view that organizes the media objects based at least on a modality of sharing of the media objects.

Example 6

The computing apparatus of Examples 1-6, where the program instructions further direct the processing system to present a historically sorted representation of the activity view that presents one or more of the communication sessions along a first directional axis in a historical timeline and presents the media objects in association with corresponding ones of the communication sessions along second directional axes.

Example 7

The computing apparatus of Examples 1-7, where the program instructions further direct the processing system to, during ones of the communication sessions, store the media objects in association with metadata comprising the contextual properties indicating at least one of time indicators of sharing of the media objects during the communication sessions, user identities that shared the media objects, communication media types employed during the sharing, and relative timing among the media objects for associated communication sessions.

Example 8

The computing apparatus of Examples 1-8, where the program instructions further direct the processing system to, during the communication sessions, present a sharing canvas interface where users communicating during the communication sessions can share associated media objects of a first media type while communicating using a second media type, and responsive to the users sharing the associated media objects, store the associated media objects and the contextual properties comprising one or more of a time of sharing onto the sharing canvas, indicators of the first media type and the second media type, and user identities.

Example 9

A method of operating a gallery service to a communication platform, the method comprising determining contextual properties associated with media objects shared over communication sessions provided by a communication platform. The method includes, based at least on the contextual properties, establishing sequencing among the media objects for each of the communication sessions, and presenting an activity view in the user interface comprising ones of the communication sessions presented with associated media objects organized at least according to associated sequencing within the associated communication session.

Example 10

The method of Example 9, further comprising presenting a contextual search interface element in the user interface, and responsive to a search initiated through the contextual search interface element, searching among the media objects to return indicators of ones of the communication sessions that are correlated to one or more contextual search terms included in the search.

Example 11

The method of Examples 9-10, where the contextual properties comprise relationships between at least media object types, communication session types, and relative timings during the communication sessions when the associated media objects are shared.

Example 12

The method of Examples 9-11, where the contextual properties comprise descriptors of user activity occurring in the communication sessions proximate to times of sharing of associated ones of the media objects.

Example 13

The method of Examples 9-12, further comprising presenting a modality sorted representation of the activity view that organizes the media objects based at least on a modality of sharing of the media objects.

Example 14

The method of Examples 9-13, w further comprising presenting a historically sorted representation of the activity view that presents one or more of the communication sessions along a first directional axis in a historical timeline and presents the media objects in association with corresponding ones of the communication sessions along second directional axes.

Example 15

The method of Examples 9-14, further comprising during ones of the communication sessions, storing the media objects in association with metadata comprising the contextual properties indicating at least one of time indicators of sharing of the media objects during the communication sessions, user identities that shared the media objects, communication media types employed during the sharing, and relative timing among the media objects for associated communication sessions.

Example 16

The method of Examples 9-15, further comprising during the communication sessions, presenting a sharing canvas interface where users communicating during the communication sessions can share associated media objects of a first media type while communicating using a second media type. The method includes, responsive to the users sharing the associated media objects, storing the associated media objects and the contextual properties comprising one or more of a time of sharing onto the sharing canvas, indicators of the first media type and the second media type, and user identities.

Example 17

A computing apparatus comprising one or more computer readable storage media, and a processing system operatively coupled with the one or more computer readable storage media. The computing apparatus includes a communication application comprising program instructions stored on the one or more computer readable storage media that, when read and executed by the processing system, direct the processing system to at least, during communication sessions provided by the communication application, determine contextual properties for media objects shared by users when communicating over the communication sessions that contextualize moments of the communication sessions to associated ones of the articles. The communication application comprises further program instructions stored on the one or more computer readable storage media that, when read and executed by the processing system, direct the processing system to at least store the media objects and corresponding contextual properties, and present a gallery view in a user interface to the communication application that organizes the media objects at least according to relationships derived from the contextual properties.

18

The computing apparatus of Example 17, where the program instructions further direct the processing system to present a contextual search interface element in the user interface, and responsive to a search initiated through the contextual search interface element, search among the media objects to return indicators of ones of the communication sessions that are correlated to one or more contextual search terms included in the search.

Example 19

The computing apparatus of Examples 17-18, where the contextual properties comprise descriptors of user activity occurring in the communication sessions proximate to times of sharing of associated ones of the media objects.

Example 20

The computing apparatus of Examples 17-19, where the program instructions further direct the processing system to, during the communication sessions, present a sharing canvas interface where users communicating during the communication sessions can share associated media objects of a first media type while communicating using a second media type.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
   one or more computer readable storage media;
   a processing system operatively coupled with the one or more computer readable storage media and;
   a gallery service comprising program instructions stored on the one or more computer readable storage media that, when read and executed by the processing system, direct the processing system to at least:
   determine contextual properties associated with media objects shared over video or audio communication sessions among two or more users provided by a communication platform;
   record at least portions of the communication sessions during times proximate or overlapping with media object sharing events;
   based at least on the contextual properties, establish internal sequencing among the media objects within each of the communication sessions; and
   present an activity view in a user interface displaying one or more recorded portions of the communication sessions and the media objects organized at least according to associated internal sequencing of the media objects within the recorded portions of the communication sessions.

2. The computing apparatus of claim 1, wherein the program instructions further direct the processing system to:
   present a contextual search interface element in the user interface;
   responsive to a search initiated through the contextual search interface element, search among the media objects to return indicators of one or more of the communication sessions that are correlated to one or more contextual search terms included in the search.

3. The computing apparatus of claim 1, wherein the contextual properties comprise relationships between at least media object types, communication session types, and relative timings within at least the recorded portions of the communication sessions when the associated media objects are shared.

4. The computing apparatus of claim 1, wherein the contextual properties comprise descriptors of user activity occurring in the communication sessions proximate to times of sharing of associated ones of the media objects.

5. The computing apparatus of claim 1, wherein the program instructions further direct the processing system to:
   present a modality sorted activity view that organizes the media objects based at least on a modality of sharing of the media objects in the one or more recorded portions of corresponding communication sessions.

6. The computing apparatus of claim 1, wherein the program instructions further direct the processing system to:
   present a historically sorted activity view that presents one or more of the communication sessions along a first directional axis in a historical timeline and presents the media objects in association with the one or more recorded portions of corresponding communication sessions along second directional axes.

7. The computing apparatus of claim 1, wherein the program instructions further direct the processing system to:
   during ones of the communication sessions, store the media objects in association with metadata comprising the contextual properties indicating at least one of time indicators of sharing of the media objects during the communication sessions, user identities that shared the media objects, communication media types employed during the sharing, and relative timing among the media objects for associated communication sessions.

8. The computing apparatus of claim 1, wherein the program instructions further direct the processing system to:
   during the communication sessions, present a sharing canvas interface where users communicating during the communication sessions can share associated media objects of a first media type while communicating using a second media type;
   responsive to the users sharing the associated media objects, store the associated media objects and the contextual properties comprising one or more of a time of sharing onto the sharing canvas, indicators of the first media type and the second media type, and user identities.

9. A method of operating a gallery service to a communication platform, the method comprising:
   determining contextual properties associated with media objects shared over video or audio communication sessions among two or more users provided by the communication platform;

recording at least portions of the communication sessions during times proximate or overlapping with media object sharing events;

based at least on the contextual properties, establishing sequencing among the media objects within each of the communication sessions; and presenting an activity view in a user interface displaying one or more recorded portions of the communication sessions and the media objects organized at least according to associated sequencing of the media objects within the recorded portions of the communication sessions.

10. The method of claim 9, further comprising:
presenting a contextual search interface element in the user interface;
responsive to a search initiated through the contextual search interface element, searching among the media objects to return indicators of the one or more of the communication sessions that are correlated to one or more contextual search terms included in the search.

11. The method of claim 9, wherein the contextual properties comprise relationships between at least media object types, communication session types, and relative timings within at least the recorded portions of the communication sessions when the associated media objects are shared.

12. The method of claim 9, wherein the contextual properties comprise descriptors of user activity occurring in the communication sessions proximate to times of sharing of associated media objects.

13. The method of claim 9, further comprising:
presenting a modality sorted activity view that organizes the media objects based at least on a modality of sharing of the media objects in the one or more recorded portions of corresponding communication sessions.

14. The method of claim 9, w further comprising:
presenting a historically sorted representation of the activity view that presents one or more of the communication sessions along a first directional axis in a historical timeline and presents the media objects in association with the one or more recorded portions of corresponding communication sessions along second directional axes.

15. The method of claim 9, further comprising:
during the one or more of the communication sessions, storing the media objects in association with metadata comprising the contextual properties indicating at least one of time indicators of sharing of the media objects during the communication sessions, user identities that shared the media objects, communication media types employed during the sharing, and relative timing among the media objects for associated communication sessions.

16. The method of claim 9, further comprising:
during the communication sessions, presenting a sharing canvas interface where users communicating during the communication sessions can share associated media objects of a first media type while communicating using a second media type;

responsive to the users sharing the associated media objects, storing the associated media objects and the contextual properties comprising one or more of a time of sharing onto the sharing canvas, indicators of the first media type and the second media type, and user identities.

17. A computing apparatus comprising:
one or more computer readable storage media;
a processing system operatively coupled with the one or more computer readable storage media and;
a communication application comprising program instructions stored on the one or more computer readable storage media that, when read and executed by the processing system, direct the processing system to at least:

during video or audio communication sessions provided by the communication application among two or more users, record at least portions of the communication sessions during times proximate or overlapping with media object sharing events, and determine contextual properties for the media objects shared by users when communicating over the communication sessions to contextualize the media objects within recorded moments of the communication sessions;

store the media objects and corresponding contextual properties; and present a gallery view in a user interface to the communication application that organizes the media objects and the recorded moments at least according to relationships derived from the contextual properties.

18. The computing apparatus of claim 17, wherein the program instructions further direct the processing system to:
present a contextual search interface element in the user interface;
responsive to a search initiated through the contextual search interface element, search among the media objects to return indicators of the one or more of the recorded moments of the communication sessions that are correlated to one or more contextual search terms included in the search.

19. The computing apparatus of claim 17, wherein the contextual properties comprise descriptors of user activity occurring in the communication sessions proximate to times of sharing of associated ones of the media objects.

20. The computing apparatus of claim 17, wherein the program instructions further direct the processing system to:
during the communication sessions, present a sharing canvas interface where users communicating during the communication sessions can share associated media objects of a first media type while communicating using a second media type.

* * * * *